Nov. 13, 1951 C. J. KIDDER 2,574,570

FLIGHT COMPUTER FOR GROUNDED AVIATION TRAINERS

Filed Oct. 8, 1947 4 Sheets-Sheet 1

CHARLES J. KIDDER
*INVENTOR.*

BY Donald F. Hillier

*ATTORNEY*

Nov. 13, 1951 C. J. KIDDER 2,574,570

FLIGHT COMPUTER FOR GROUNDED AVIATION TRAINERS

Filed Oct. 8, 1947 4 Sheets-Sheet 2

CHARLES J. KIDDER
*INVENTOR.*

BY Donald T. Hillier

*ATTORNEY*

Nov. 13, 1951 C. J. KIDDER 2,574,570
FLIGHT COMPUTER FOR GROUNDED AVIATION TRAINERS
Filed Oct. 8, 1947 4 Sheets-Sheet 3

CHARLES J. KIDDER
*INVENTOR.*

BY Donald T. Hillier

*ATTORNEY*

CHARLES J. KIDDER
*INVENTOR.*
BY Donald T. Hillier
*ATTORNEY*

Patented Nov. 13, 1951

2,574,570

UNITED STATES PATENT OFFICE 2,574,570

FLIGHT COMPUTER FOR GROUNDED AVIATION TRAINERS

Charles J. Kidder, Binghamton, N. Y., assignor to Link Aviation, Inc., Binghamton, N. Y., a corporation of New York Application October 8, 1947, Serial No. 778,712

3 Claims. (Cl. 35—12)

This invention relates to a flight computer for grounded aviation trainers, and is an improvement in the general type of computers disclosed in the copending application of H. Frederick Schaefer, Jr., Serial Number 737,696, filed March 27, 1947, for Computer for Aviation Trainer and the Like.

Such computers are generally designed by taking the values of the functions concerned from a rectilinear graph and replotting the same in the form of a curvilinear graph which lends itself to the design of a computer having a master pivot which may be positioned relative to the curvilinear graph by the input functions and an output member or members connected to the master pivot to be positioned thereby according to the value of the resultant output function or functions determined by the values of the input functions.

It is a principal object of this invention to provide a novel flight computer of the general type mentioned above in which the inputs are the factors of assumed air speed and assumed pitch attitude, and the output factors are assumed horsepower required and assumed vertical speed.

It is a more specific object of this invention to provide a flight computer in which the master pivot moves in an elliptical path when the input factors of assumed air speed and assumed pitch attitude are changed in such a manner that no change in the output factor of assumed vertical speed occurs. A related object of this invention is to provide in a computer of the general type mentioned an ellipsographic mechanism interconnecting the master pivot and the vertical speed output member so that when the master pivot is moved in an elliptical path in response to changes in the input factors no movement of the vertical speed output member will occur.

Other related objects of this invention will become apparent as the description proceeds, for a clear understanding of which reference is made to the accompanying drawings, in which, Fig. 1 is a perspective view of the air speed integrator which is associated with the apparatus of this invention.

Figure 1:
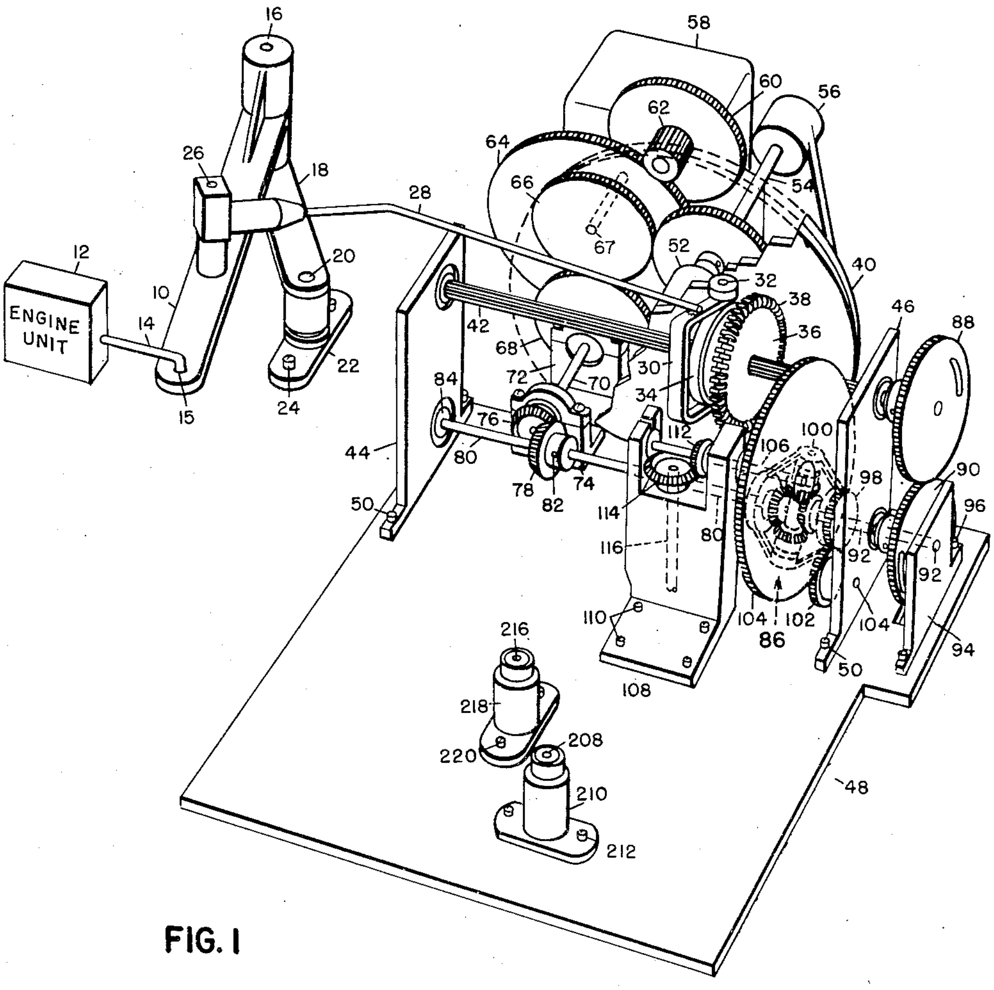

Reference is now made to Fig. 1 wherein it will be seen that the left end of the walking beam 10 is connected to the engine unit 12 which is shown in block form through any suitable means such as the link 14 which is pivoted at 15. The engine unit 12 may be of the type disclosed in U. S. Patent 2,553,526, dated May 15, 1951, and issued in the names of Kenneth H. Chapple and Raymond E. Kittredge for Maximum Available Manifold Pressure and Brake Horsepower Computers, or the engine unit 12 may take any other desired form. The right end of walking beam 10 is pivoted upon the stud 16 carried by the right end of arm 18, the left end of which in turn is pivoted upon the shaft 20 which is carried by the bracket 22 which may be suitably affixed by screws 24 at any convenient point within the fuselage of the trainer. The stud 26 is carried by the walking beam 10 at a distance from the pivot 16 equal to the distance of pivot 20 from pivot 16, and pivotally carried by stud 26 is the forward end of link 28, the rear end of which is fixedly attached to the upper arm of yoke 30. The arms of yoke 30 are pivotally mounted upon two studs 32 (only one shown) which are carried by the hub 34 which is integral with the driven disc 36. Around the periphery of disc 36 are placed a plurality of metallic washers 38 which are arranged to bear against the left face of the driving disc 40, which face is preferably covered with a non-slipping substance, such as rubber.

The driven disc 36 is mounted upon the splined shaft 42 to rotate the same and for axial movement therealong in response to movements of the link 28, this splined shaft being carried by the end brackets 44 and 46 which are affixed to the base plate 48 by means of screws 50. The hub of the driving disc is designated 52 and is carried by the left end of the horizontal shaft 54 which is in turn rotatably mounted in the upper end of bracket 56 which is held by the base plate 48.

A constant speed motor 58 is provided, the output gear of which is designated 60 and is affixed to the pinion 62 to drive the same. Gear 64 is driven by pinion 62, and affixed to the face of gear 64 is the gear 66 which is driven thereby, gears 64 and 66 being mounted upon the supporting shaft 67. Gear 66 drives the gear 68 which is affixed upon the horizontal shaft 70 supported by the brackets 72 and 74 which are affixed upon the base plate 48. Affixed upon the left end of shaft 70 is the bevel gear 76 which drives the second bevel gear 78 which is pinned upon the horizontal shaft 80 by means of pin 82, shaft 80 having its left end rotatably held in the bearing 84 held by bracket 44. Shaft 80 forms the first input of the conventional bevel gear differential designated generally by 86.

Affixed upon the rear end of the splined shaft 42 is the spur gear 88, which gear drives the spur gear 90 which is mounted upon the horizontal shaft 92 which forms the second input to the differential 86. Shaft 92 is supported by brackets 46 and 94, the bracket 94 being affixed to the base plate 48 by means of screws 96. The output gear of the differential 86 is numbered 98, this gear being freely mounted upon the input shaft 92 and affixed to the spider 100 of differential 86. The output gear 98 meshes with the output idler 102 which is carried by the stud 103 supported by bracket 46, and gear 102 meshes with the spur gear 104 to drive the same. Gear 104 is affixed upon the horizontal shaft 106 supported by the bracket 108 which is affixed to the base plate 48 by means of screws 110. Affixed upon shaft 106 is the bevel gear 112 which drives the bevel gear 114 which in turn is affixed upon the upper end of the vertical shaft 116 carried by bracket 108.

Figure 2:
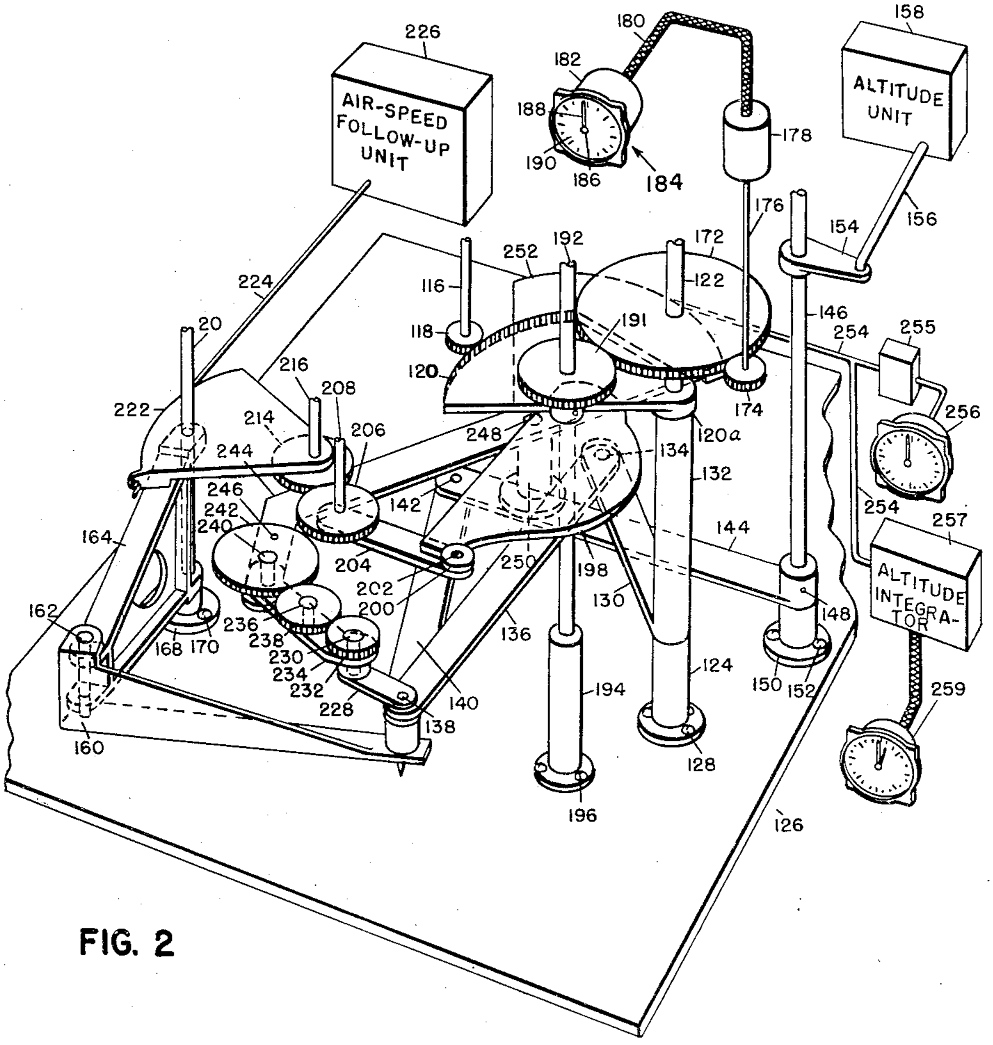
Fig. 2 is a perspective view of the novel computer of this invention.

Reference is now made to Fig. 2 where the lower end of the vertical shaft 116 is shown, and it will be seen that there is affixed upon the lower end of this shaft the gear 118 which drives the sector 120 meshing therewith, sector 120 being affixed upon the vertical shaft 122 to position the same. The upper end of vertical shaft 122 may be suitably rotatably mounted within a bracket (not shown) attached to the bottom of the upper base plate 48 of Fig. 1, and the lower end of vertical shaft 122 is rotatably mounted in the bracket 124 which is affixed upon the lower base plate 126 by means of screws 128.

Affixed upon the vertical shaft 122 to be rotated thereby is the arm 130 which has an integral elongated hub 132 which in turn is integral with the hub 120*a* of sector 120. The outer end of arm 130 carries the pivot 134, and this pivot also carries the right end of the link 136, the other end of which is held by the master pivot 138. The master pivot 138 also holds the left end of the link 140, the right end of which carries the pivot 142 which also holds the forward end of the arm 144. Arm 144 has its rear end affixed upon the vertical shaft 146 by means of pin 148, and the lower end of shaft 146 is supported by the bracket 150 which is affixed to the lower base plate 126 by means of screws 152. The upper end of shaft 146 may be suitably rotatably carried by a bracket (not shown) attached to the lower surface of plate 48 of Fig. 1, and affixed upon the vertical shaft 146 is the arm 154 to the outer end of which is pivotally connected the link 156. Link 156 has its other end connected to the attitude unit 158 of the trainer. The attitude unit of the trainer may take any suitable desired form, provided that it positions the output link 156 or the equivalent according to the instant assumed position of the airplane represented by the trainer about its transverse axis, sometimes referred to hereinafter as "pitching position" or "pitch attitude."

Still referring to Fig. 2, it will be seen that the master pivot 138 also carries the rear end of the link 160, the forward end of which carries the pivot 162. This pivot connects the forward end of link 160 and the left end of arm 164, the right end of which is affixed upon the vertical shaft 20 to position the same. The lower end of shaft 20 is carried by bracket 168 which is affixed by screws 170 (only one shown) to the lower base plate 126. The upper end of shaft 20 is shown in Fig. 1, and as previously explained, the left end of arm 18 is affixed thereupon. In Fig. 2 it will be seen that the gear 172 is affixed upon the upper end of the vertical shaft 122, and drives the pinion 174 which is affixed upon the lower end of the shaft 176 which is the input shaft of the self-synchronous motor transmitter 178. Transmitter 178 is connected through the cable 180 to the self-synchronous receiver 182 which forms a part of the airspeed indicator designated generally by 184. This indicator includes the output shaft 186 and the needle 188 mounted thereupon to move over the dial 190 which is graduated to simulate the air speed indicator in the plane being simulated. The construction of the air speed indicator 184 and the functioning of this indicator in response to movements of the input shaft 176 of the self-synchronous transmitter 178 which is connected thereto is well known to those skilled in the art, and accordingly a more detailed explanation is not deemed necessary.

As also disclosed in Fig. 2, the gear 172 drives the gear 191 which is affixed upon the vertical shaft 192, the upper end of this shaft being suitably mounted in a bracket (not shown) affixed to the bottom of the upper base plate 48 of Fig. 1, the lower end of shaft 192 being carried by bracket 194 which is affixed by screws 196 to the lower base plate 126. Also affixed upon the vertical shaft 192 is the cam 198 against which bears the roller 200 carried by the pin 202 which in turn is carried by the outer end of arm 204. The forward end of arm 204 is affixed to the gear 206 which is freely mounted upon the lower end of the vertical shaft 208, the upper end of which as seen in Fig. 1 is held by the bracket 210 which is affixed to the base plate 48 by screws 212. Gear 206 in Fig. 2 meshes with and drives the gear 214 which is affixed upon the lower end of vertical shaft 216, the upper end of which as seen in Fig. 1 is held by the bearing 218 which is attached to the upper surface of the upper base plate 48 by means of screws 220. The hub of sector 222 is attached to gear 214 to rotate therewith, and the left end of cable 224 is attached to this sector to be positioned thereby. Cable 224 has its right end connected to the air speed follow-up unit 226, which unit may be employed as the distribution unit for introducing the effect of air speed into various other units in the trainer whose operation is dependent at least in part upon the effect of air speed. Such units may include the wind drift unit, artificial horizon, stall unit, true air speed conversion unit, air speed torque unit, and trainer attitude unit. Cable 224 is spring loaded by any suitable arrangement within the air speed follow-up unit 226.

The cam 198 is provided to convert the non-linear motion of gear 191 in response to changes in the factor of assumed air speed into a linear motion of arm 204 in response to changes in the same factor, because the units operated by the air speed follow-up unit are ordinarily constructed to properly function in response to a linear input.

Still referring to Fig. 2, the master pivot 138 also holds the rear end of link 228, upon the forward end of which is affixed the stud 230, and stud 230 has the gear 232 affixed thereupon. The rear end of link 234 is freely mounted upon the stud 230, the central portion of this link carrying the pin 236 upon which is mounted the idler gear 238. The forward end of link 234 carries the pin 240 upon which the gear 242 is freely mounted. Pin 240 also freely carries the left end of the bent arm 244 while gear 242 is affixed to arm 244 by means of pin 246. The right end of arm 244 is affixed upon the pin 248, which pin is carried by the bracket 250 which is affixed to the base plate 126. Integral with the arm 244 is the sector 252 to which is affixed the forward end of cable 254 which runs to the intermediate connecting apparatus shown in box form and numbered 255 which in turn is connected to the vertical speed indicator 256. The cable 254 also is the input to the altitude integrator 257 which in turn controls the reading of the altimeter 259. For a disclosure of a typical type of intermediate connecting apparatus, vertical speed indicator, altitude integrator and altimeter, reference may be made to the copending patent application previously mentioned, Serial Number 737,696.

Figure 3:
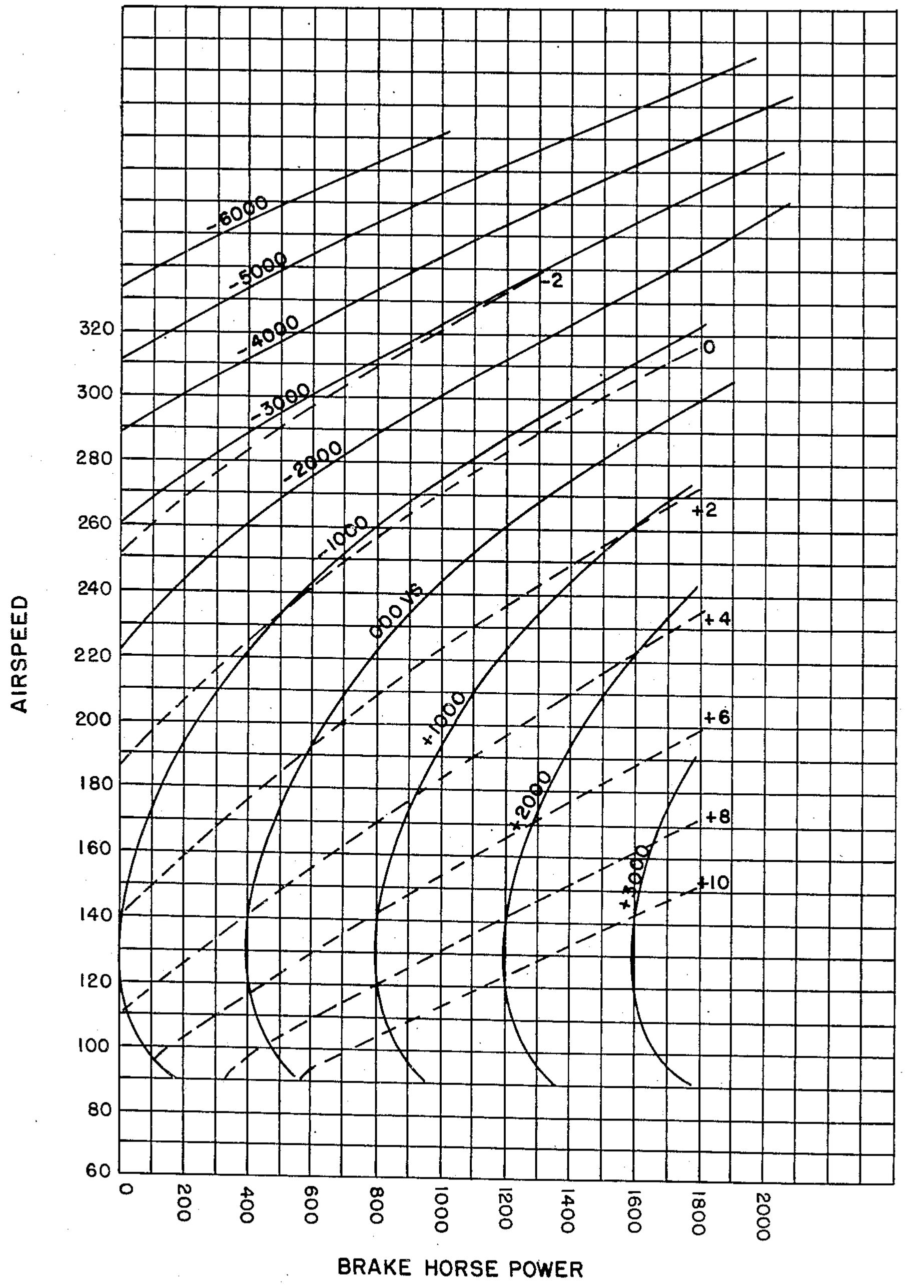
Fig. 3 is a rectilinear graph of the functions of air speed, pitch attitude, horsepower required and vertical speed.

The graphical basis of the flight computer disclosed in Fig. 2 will now be described. Reference is made to Fig. 3 which is a rectilinear graph of the flight characteristics of the plane being simulated, this graph showing the inter-relation of the factors of brake horsepower, air speed, pitch attitude and vertical speed. Knowing the value of any two of the four just mentioned variables, the values of the remaining two variables may be ascertained by inspection from the graph of Fig. 3. For example, at an air speed of 200 knots and a pitch attitude of plus two degrees, a brake horsepower of 700 is required to maintain the flight of the plane at the just stated air speed and attitude, and a positive vertical speed of about 100 feet per minute will be realized.

Figure 4:
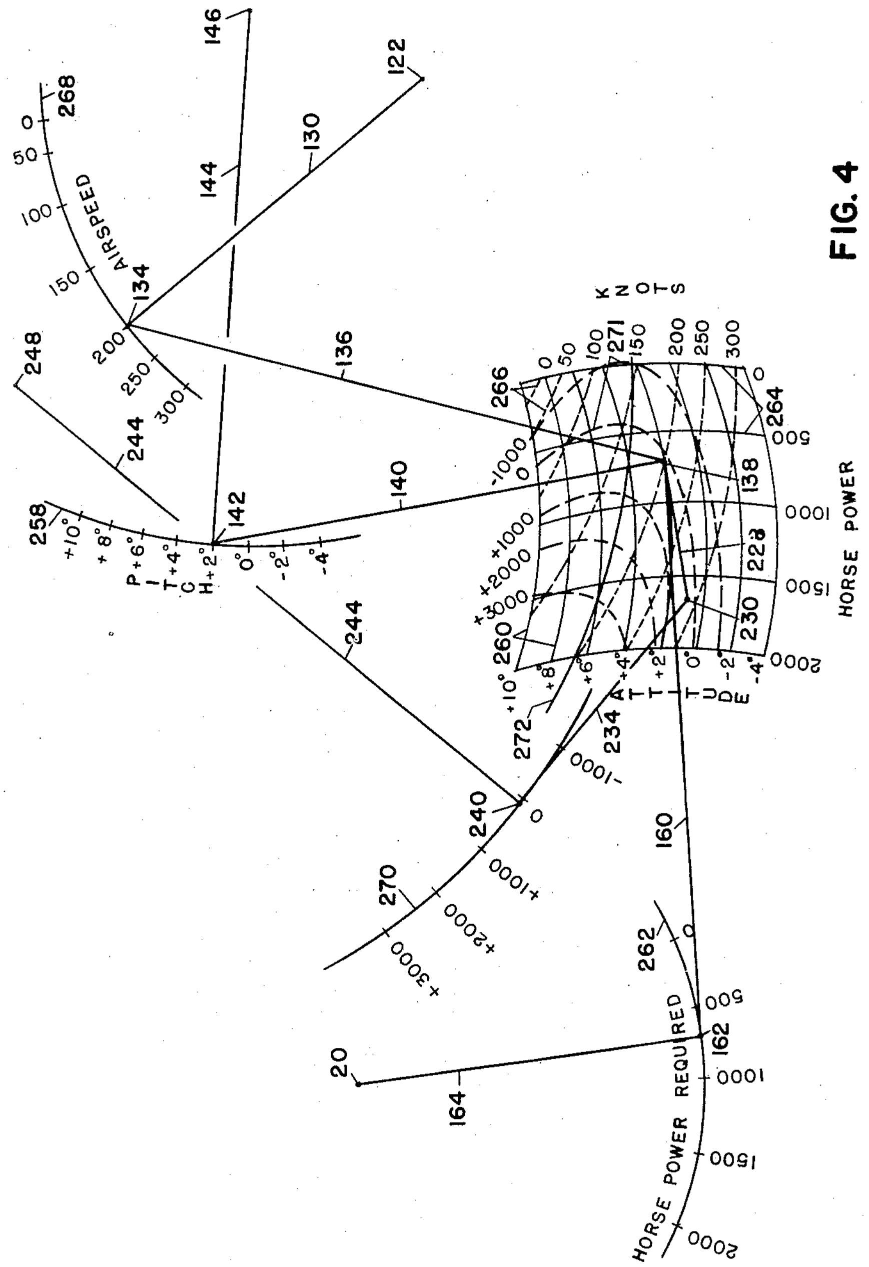
Fig. 4 is a graph showing the values of the functions disclosed in Fig. 3 replotted in the form of a curvilinear graph, together with a schematic representation of the pivots, arms and linkages of the computer of this invention superimposed thereon.

Reference is now made to Fig. 4 where the values shown in Fig. 3 are replotted in a curvilinear form satisfactory for the design of the computer of this invention. The orientation of the four variables relative to one another as shown in Fig. 4 is different from that shown in Fig. 3, but the graph of Fig. 4 is such that, being given the values of any two of the variables, the values of the remaining two will be approximately the same as shown in Fig. 3. For example, using the previously cited example of an air speed of 200 knots and a pitch attitude of plus two degrees, by reference to the graph of Fig. 4 it will be seen that a brake horsepower of about 700 is required, and that a positive vertical speed of about 100 feet per minute will take place.

Referring now to Figs. 2 and 4, the latter figure showing a schematic superimposition of the computing apparatus of Fig. 2 upon the graph shown in Fig. 4, the designing of the apparatus of Fig. 2 was accomplished by selecting the location of the fixed pivot 146 and the selection of a proper length for the arm 144. The pitch arc 258 was then drawn, this arc having its center at the fixed pivot 146 and having a radius equal to the selected length of link 144. The pitch arc 258 was then drawn, this arc having its center at the fixed pivot 146 and having a radius equal to the selected length of link 144. The pitch arc 258 was then marked off into segments of equal length, and each of the marks upon this arc being given a value from minus four to plus 10, representing assumed positions of the airplane about its transverse axis. A suitable length was then selected for the link 140, and by successfully placing the pivot 142 upon the various points marked upon the pitch arc 258, and using a radius equal to the length of link 140, the attitude curves 260 were drawn, each of these curves being assigned a number equal to the value of the point along the pitch arc 258 serving as its center.

The position of the fixed brake horsepower required pivot 20 was then selected, and employing a radius equal to the desired length of link 164, the horsepower required arc 262 was drawn, this arc having its center at the fixed pivot 20. The horsepower required arc 262 was then divided into increments of equal length, the dividing points along this arc being designated in increments of 500 from zero to 2,000. Employing a length equal to the desired length of link 160, and using the various division marks along the horsepower required arc 262 as centers, the brake horsepower required curves 264 were drawn, each of these curves being labelled with a value equal to the value of the point along arc 262 serving as its center.

The various air speeds for the values of brake horsepower and pitch attitude as shown in Fig. 3 were then plotted upon the graph of Fig. 4 and were found to describe the air speed curves 266. The center of each of the air speed curves 266 was then located, and the arc 268 was drawn through the three points which were the centers of the 300, 150 and zero air speed curves 266. The length of link 136 was determined by the radius lengths of the air speed curves, primary consideration being given to those curves within the most used range of air speed. The center of the arc 268 becomes the location of the fixed air speed pivot 122, and link 130 is given a length equal to the radius of that arc. The various points along the air speed arc 268 which are the centers of the air speed curves 266 are given a value equal to the curve 266 of which it is the center.

The various values of vertical speed as shown in Fig. 3 were then plotted in Fig. 4, and it was found that these values produced curves very close to a family of ellipses having major and minor axes of approximately equal dimensions. Each of the ellipses 271 was labelled with the proper vertical speed value from minus 1000 to plus 3000 feet per minute in increments of 1000 feet per minute.

The center of each of the ellipses 271 (intersection of major and minor axes of each ellipse) was then ascertained and plotted, and it was found that these centers define the arc 270. The point along arc 270 which is the center of each ellipse 271 is labelled with a value corresponding to the value of the ellipse. The center of the arc 270 was then ascertained, and this center is the location of the fixed pivot 248. The radius of the arc 270 is equal to the straight-line length of the arm 244 from pin 240 to pivot 248.

The point of intersection of each of the ellipse curves 271 upon Fig. 4 with the major axis of the ellipse was determined, and it was found that these points of intersection defined a second arc 272, which arc may be referred to as the arc of vertices. This arc was found to be slightly offset from the arc of the centers of ellipses 270, but the two arcs were found to be concentric.

The ellipsograph including the link 228, pin 230, gear 232, link 234, pin 236, gear 238, pin 240 and gear 242 was then designed so that when the master pivot 138 is at any point above a given ellipse 271, e. g., the zero vertical speed ellipse, the pivot 240 remains fixed in position above the arc 270 in the corresponding vertical speed position. The maximum length of the elements interconnecting pivot 240 and the master pivot 138 prevails when the master pivot 138 is above the circle of vertices 272, in which case pivots 240, 230 and 138 form a straight line. The pivot 240 is at all times at some point along the arc of centers 270, regardless of the location of the master pivot 138. When the master pivot is displaced from the arc of vertices, the master pivot lies upon the proper ellipse centered in the arc of centers 270 for the prevailing assumed vertical speed. Consequently, the pivot 240 will be properly positioned along arc 270 for the prevailing assumed vertical speed because of the stated method of design of the ellipsograph.

By virtue of the previously explained graphical basis for the design of the computer shown in Fig. 2, it will be appreciated that whenever the shaft 122 of Fig. 2 is positioned for a given assumed air speed, e. g., 200 knots, the pivot 134 will be positioned above the 200 mark upon the air speed arc 268 and by means of link 136 the master pivot 138 will necessarily be positioned at some point above the 200 knot air speed curve 266. Also, whenever the assumed pitch attitude is of a given amount, e. g., two degrees of climb, the fixed pivot 146 will be rotationally positioned so that the pivot 142 will be above the two degree climb mark up on the pitch arc 258. By virtue of link 140, the master pivot 138 will be positioned at some point above the two degree pitch arc 260. Inasmuch as the horsepower required curves 264 bear the proper relationship to the air speed curves 266 and pitch attitude curves 260, it will be appreciated that the resultant positioning of the master pivot 138 relative to the horsepower required curves 264 will indicate the horsepower required to maintain the assumed flight of the plane at the instant assumed pitch attitude and air speed. The position of the master pivot 138 relative to the horsepower required curves 264, by means of link 160, properly positions the pivot 162, arm 164 and fixed horsepower required pivot 20 in accordance with the horsepower required for the prevailing assumed conditions of air speed and pitch.

By virtue of the previously described relationship between the vertical speed ellipses 271 and the other three families of curves shown in Fig. 4, it will also be appreciated that the positioning of the master pivot 138 by the pitch and air speed inputs also properly positions the master pivot 138 relative to the vertical speed curves 271. The previously described ellipsographic mechanism connecting the master pivot 138 and the output arm 244 properly positions pivot 240 and arm 244 about the fixed pivot 248 in accordance with the proper assumed vertical speed for the prevailing inputs of pitch and air speed.

It will be appreciated that the locations of the pivots and lengths of the arms, linkages, arcs, etc., of Fig. 4 are not determined by formula, but must be given definite positions and lengths by trial and error. For example, after an initial construction of the arcs 260 and 264, in order for the arcs 266 to have centers which in turn generally define another arc (in the illustrated case the arc 268), it may be necessary to adjust the position of any previously selected pivots or the length of any previously selected link or arm. However, for an airplane having the flight characteristics shown in Fig. 3, the disclosure of Fig. 4 shows one possible location of pivots, lengths of parts and range of movements of the parts of a satisfactory computer. In view of the fact that Fig. 4 shows the exact relative positions of the fixed pivots and lengths of the links of the disclosed embodiment of the invention, the disclosed embodiment of the invention may be easily reproduced by employing the proportionate dimensions shown in Fig. 4.

Inasmuch as the air speed curves 266 are non-linearly spaced, the gear 191 in Fig. 2 moves non-linearly in response to changes in the factor of assumed air speed. Cam 198 is employed to transform this non-linear motion of gear 191 into a linear motion of cable 224, because the units operated by the air speed follow-up 226 are ordinarily designed to operate in response to a linear assumed air speed input. The movement of the needle 188 across the dial 190 of the air speed indicator is such that the indicated assumed air speed corresponds to the position of pivot 134 along arc 268.

Assuming the situation where the trainer is being flown under assumed static flight conditions, pivot 26 interconnecting the forward end of link 28 and the brake horsepower walking beam 10, seen in Fig. 1, will be exactly above the brake horsepower required pivot 20. The link 28 will position the driven disc 36 to the right of the center of the driving disc 40 by a predetermined amount. Inasmuch as the driving disc 40 is rotated clockwise at a constant rate of speed by the motor 58, the driven disc 36 will be rotated clockwise at a predetermined rate, as will the splined shaft 42 and the gear 88 affixed upon the right end thereof. The gear 90 will be rotated counterclockwise at a predetermined rate of speed, as will the input shaft 92 of the differential 86. At the same time the shaft 70 will be rotated clockwise by motor 58 at a predetermined rate of speed, as will the bevel gear 76 and the bevel gear 78 together with the shaft 80 upon which the latter gear is affixed. Consequently shaft 80 which forms the second input of differential 86 will be rotated in the opposite direction from the input shaft 92, and the driving ratios are such that under the conditions being assumed the input of shaft 80 is exactly equal to the input of shaft 92. Accordingly, the inputs to the differential 86 are equal and opposite, as the output gear 98 remains stationary. Inasmuch as the output gear remains stationary, gears 102 and 104 will likewise remain stationary, as will the shaft 106, gear 112, gear 114, and shaft 116, the lower end of which is shown in Fig. 2. Gear 118 will remain stationary as will sector 120, and the vertical shaft 122, the arm 130 and air speed arm 136 will all remain stationary. Accordingly, the master pivot 138 is not changed in position by the air speed input, and inasmuch as the input from the attitude unit 158 is stationary for the condition being assumed, the pitch input of the flight computer similarly will not be changed. Accordingly, the entire apparatus shown in Fig. 2 will remain in static condition as long as the air speed and attitude remain unchanged.

Considering the operation of the apparatus of this invention when the trainer is being "flown" in the static flight condition, and then an increase in brake horsepower available occurs, the link 14 of Fig. 1 operated by the engine unit 12 will be positioned ahead so that the pivot 26 lies ahead of the pivot 20, because the horsepower available will actually exceed the horsepower required, which condition will permit acceleration. The link 28 will move ahead, pulling the driven disc 36 to the left of the position this disc occupies under assumed static flight conditions. The disc 36 will be rotated slower than the static flight condition previously explained, and consequently the input shaft 92 of the differential 86 will be rotated counterclockwise at a slower rate than the input shaft 80 is rotated clockwise. Consequently, the output gear 98 affixed to the spider 100 of the differential will be rotated clockwise, resulting in a counterclockwise rotation of gear 102, and a clockwise rotation of gear 104. Shaft 106 and gear 112 will be rotated clockwise as will the gear 114 and the input shaft 116. Referring to Fig. 2, the clockwise rotation of shaft 116 results in a similar rotation of gear 118, and sector 120 is rotated counterclockwise, rotating shaft 122 and the arm 130 affixed thereupon counterclockwise. The counterclockwise rotation of arm 130 results in a movement of the pivot 134 counterclockwise in Fig. 4, from a lower assumed air speed position to a higher assumed air speed position, and consequently by means of link 136 the master pivot 138 tends to move generally downwardly in Fig. 4, in the direction of the higher assumed air speed curves 266. Assuming that the pitch attitude does not change, the motion of the master pivot 138 is about the pivot 142, and accordingly the motion of the master pivot will be to the left in Fig. 4 from a lower air speed position to a higher air speed position and from a lower horsepower required position to a higher horsepower required position, as indicated by the air speed curves 266 and horsepower required curves 264. This movement, of course, positions the pivot 162 to the left along the horsepower required arc 262, and the arm 164 and shaft 20 will be rotated counterclockwise. Referring back to Fig. 1, the counterclockwise rotation of the shaft 20 will result in a similar rotation of the arm 18 and of the pivot 16 carried by the outer end thereof. The clockwise rotation of pivot 16 results in a similar movement of the right end of arm 10, this arm pivoting about the pivot 15, and the pivot 26 carrying the forward end of link 28 is moved to the right. The movement of link 28 to the right also moves the driven disc 36 in the same direction, resulting in an increase in the rate of speed of rotation of the driven disc 36. Accordingly, the input shaft 92 of differential 86 will be gradually rotated counterclockwise at a higher rate of speed, resulting in a slowing down of the rotation of the output gear 98 of the differential. The gradual slowing down of the output of the differential 86 will result in a gradual decrease in the rate of rotation of the input shaft 116 to the computer of Fig. 2, and the rate of movement of the master pivot 138 from the low air speed position toward a higher air speed position, as well as from a lower brake horsepower required position to a higher brake horsepower required position will also gradually decrease. This decrease in rate of operation of the apparatus will continue until the pivot 26 has been moved to the rear to the position exactly above the horsepower required pivot 20. When that condition is realized, the driven disc 36 will be positioned along the driving disc 40 at the point required to neutralize the two inputs to the differential 86. When the pivot 26 has been repositioned exactly above the pivot 20, the master pivot 138 will be relative to the theoretical horsepower required curve 264 at a value corresponding to the value represented by the instant position of the link 14 operated by the engine unit 12. This relationship may be obtained by designing the apparatus so that when the arm 164 of Fig. 4 is in a given horsepower required position, e. g., the 1,000 brake horsepower required position, and link 14 of Fig. 1 is in the corresponding brake horsepower available position, the pivots 20 and 26 are aligned.

As the position of the shaft 122 changes with the increase in assumed air speed, the indicated assumed air speed as given by the air speed indicator 184 also increases, by virtue of the operation of gears 172 and 174, shaft 176, transmitter 178, cable 180 and receiver 182. Also, by means of gears 172 and 190, shaft 192, cam 198, roller 200, arm 204, gears 206 and 214, and sector 222, the position of the air speed cable 224 which forms the input to the air speed follow-up unit is properly changed so that the various units previously mentioned to be affected by changes in assumed air speed are properly operated.

At the same time that the master pivot 138 is being moved from the lower air speed position toward the higher air speed position, and from the lower horsepower required position to the higher horsepower required position, it will be appreciated that the master pivot 138 will move from an algebraically lower vertical speed position to an algebraically higher vertical speed position, and by means of the interconnecting apparatus, the vertical speed output arm 244 will be rotated clockwise in Fig. 4 into a higher assumed vertical speed position. By means of sector 252 and cable 254, the vertical speed indicator is caused to indicate an algebraically higher assumed vertical speed, and the algebraically higher assumed vertical speed is introduced into the altitude integrator.

It should be particularly noted that when the assumed increase in horsepower available first occurs the driven disc 36 is displaced a maximum amount to the left in Fig. 1 for the change in question. The speed of the disc falls to the minimum, and the output of the differential is at the maximum, resulting in a relatively rapid movement of the master pivot 138, a relatively rapid change in the indicated air speed as given by indicator 184, a relatively rapid change in the position of the cable 224 which serves as an input to the airspeed follow-up unit 224, and in a relatively rapid change in the position of the vertical speed arm 244 and sector 252 and cable 254. Consequently, a relatively high algebraic increase in assumed vertical speed will be shown by the vertical speed indicator 256, and the relatively high vertical speed introduced into the altitude integrator 257 will result in a relatively rapid assumed increase in altitude being given by the altimeter 259.

However, as the master pivot changes its position from a lower horsepower required position to a higher horsepower required position, the clockwise rotation of the pivot 20 results in a gradual movement to the rear of link 28 and in an increase in the speed of the driven disc 36, a slowing down of the output of the differential 86, and in a slowing down of the rate of change of indicated air speed, indicated vertical speed, indicated altitude and input to the air speed follow-up unit 226. This slowing down of rate of change will continue until the apparatus has reached the static condition wherein the master pivot 138 is in the required horsepower position equal to the position of the available horsepower link 14.

This operation of the apparatus to produce a relatively great change in the indicated air speed, indicated vertical speed, indicated altitude and input to the air speed follow-up unit, followed by a gradual decrease in rates of change until the static condition is obtained accurately simulates the performance of aircraft in response to an increase in brake horsepower available. The lag in the operation of the apparatus occurring immediately after the increase in horsepower available occurs simulates the lag in the case of a plane in actual flight in reaching the maximum rates of change in the foregoing respects.

On the other hand, assuming that the trainer is being flown under assumed static flight conditions and a decrease in the factor of brake horsepower available occurs, the link 14 in Fig. 1 will move to the rear displacing the pivot 26 to the rear of the pivot 20 and moving link 28 to the rear of its static flight position, resulting in a displacement of the driven disc 36 to the right of its static flight position relative to the driving disc 40. The speed of the driven disc 36 will be increased above its cruising speed, and the input shaft 92 of differential 86 will be rotated counterclockwise at a greater rate of speed. The rotation of this input shaft will be greater than the rotation of the input shaft 80, resulting in a counterclockwise rotation of the differential output gear 98. Gear 102 will be rotated clockwise, while gear 104 and shaft 106 will be rotated counterclockwise, as will the bevel gear 112, bevel gear 114, and the air speed input shaft 116. Referring to Fig. 2, it is believed unnecessary to explain in detail that the counterclockwise rotation of the input shaft 116 will result in a movement of the master pivot 138 from a higher assumed air speed position to a lower assumed air speed position, from an algebraically higher assumed vertical speed position to an algebraically lower assumed vertical speed position, and from a higher horsepower required position to a lower horsepower required position. The movement of the master pivot will affect the position of link 160, moving the pivot 162 into a lower horsepower required position, and rotating the horsepower required pivot 20 counterclockwise, as seen in Fig. 1. The resulting counterclockwise rotation of arm 18 will result in a movement of the link 28 toward the front, moving the driven disc 36 back toward its static flight position. The operation of the apparatus in the foregoing respect will continue until the pivot 26 of Fig. 1 has been returned to the position exactly above the pivot 20, at which time the driven disc 36 will have been returned to the static flight position.

During the operation of the apparatus in response to the decrease in assumed horsepower available, the air speed indicator 184, the vertical speed indicator 256, the altitude integrator 257 and altimeter 259 will all have their indications properly changed, and the input cable 224 to the air speed follow-up unit 226 will be properly operated to introduce a lower assumed air speed into the follow-up unit.

The slight lag during the initial operation of the apparatus in response to the decrease in assumed horsepower available is also present until the maximum rate of change of indicated air speed, indicated vertical speed, indicated altitude and change of input to the air speed follow-up unit 226 are obtained, and then the rate of change of the four units in question gradually decreases until the static condition is realized, exactly as in the case when the assumed horsepower available was increased.

Considering now the operation of the apparatus in response to a change in the assumed pitching position of the plane represented by the trainer about its transverse axis, when the apparatus is in the static flight condition and it is assumed that the nose of the plane is lowered, referring to Fig. 2 the link 156 moves to the right, resulting in a counterclockwise rotation of the arm 154, shaft 146 and arm 144. In Fig. 4 it will be seen that the pivot 142 is moved downwardly, resulting in a similar movement of the link 140 and in a movement of the master pivot 138 from an algebraically higher attitude position to an algebraically lower attitude position. The air speed pivot 134 for the time being remains stationary, and accordingly the master pivot 138 moves in an arc about pivot 134. The resulting movement to the rear of link 160 results in a counterclockwise rotation of the arm 164, moving this arm into a lower horsepower required position. Referring to Fig. 1, the counterclockwise rotation of pivot 20 results in a similar rotation of the pivot 16 and in a movement ahead of the pivot 26 and link 28, link 28 moving in the same direction in which it is moved as a result of an increase in the factor of assumed horsepower available. Accordingly, the driven disc 36 is displaced to the left of its static flight position, and the input shaft 92 of differential 86 is rotated counterclockwise at a decreased rate of speed. The output gear 98 of the differential is rotated clockwise, resulting in a similar rotation of the bevel gears 112 and 114, and of the air speed input shaft 116. Referring to Fig. 2, the rotation of the input shaft 116 in the clockwise direction results in a movement of the master pivot 138 from a lower assumed air speed position to a higher assumed air speed position. This movement of the master pivot will be in an arc about the pivot 142, because the pitch input will now be constant, and master pivot 138 will move ahead, or to the left in Fig. 4 into a higher horsepower required position. This movement of the master pivot 138 will result in a movement to the left of link 160, and in a clockwise rotation of the pivot 162, arm 164 and horsepower required pivot 20. Referring to Fig. 1, the clockwise rotation of the horsepower required pivot will result in a movement to the rear of the link 128 and the driving disc 36.

The foregoing operation of the apparatus will continue until the link 28 has been moved back to the static flight position, returning disc 36 to the position required to cause the input shaft 92 of differential 86 to rotate at the same speed as the constant speed input shaft 80 of the same differential.

As the assumed air speed increases, the arm 130 is rotated counterclockwise in Figs. 2 and 4, and inasmuch as the pivot 142 is held stationary by the attitude unit 158, the movement of link 136 results in a movement of the master pivot 138 parallel to the attitude curves 260 and toward the higher air speed curves 266. Also, pivot 138 moves in the direction of the higher brake horsepower required curves 264, resulting in a clockwise motion of pivot 162, arm 164 and the brake horsepower pivot 20. Referring to Fig. 1, the clockwise rotation of pivot 20 results in a movement to the rear of link 28, and in an increase in the speed of the driven disc 36, which in turn results in a decrease in the rate of turning of the air speed input shaft 116, etc., until the disc 36 has been returned to the static flight position.

During the just described operation of the apparatus of this invention, the air speed indicator has its reading changed with changes in the position of the master pivot 138 relative to the air speed curves 266, and the reading of the vertical speed indicator is changed with movements of the master pivot 138 relative to the vertical speed ellipses 270. The altitude integrator integrates the successive vertical speeds to cause the altimeter to indicate the proper varying altitudes, and the air speed input to the air speed follow-up is properly changed.

In the event the apparatus of this invention is in the static operating condition and the attitude unit 158 is operated as a result of an assumed raising of the nose of the plane represented by the trainer, the pivot 138 is moved in the direction of the algebraically higher attitude curves 260, and parallel to the air speed curves 266. The driven disc 36 of Fig. 1 moves to the right of its static flight position, resulting in a lower assumed air speed input to the computer. The master pivot 138 moves about pivot 142 parallel to the attitude curves 260 in the direction of the lower air speed curves and lower brake horsepower required curves. The driven disc 36 is moved back to its static flight position at a constantly decreasing rate of speed. The indicators have their indications properly changed, as is the input to the air speed follow-up unit 226.

In view of the preceding illustrations of the operation of the apparatus of this invention it will be appreciated that the flight computer shown in Fig. 2 and schematically outlined in Fig. 4 computes the horsepower required at all times to maintain the "flight" of the trainer at the instant assumed air speed and assumed pitch attitude. The determined horsepower required is at all times compared with the instant assumed horsepower available output from the engine unit, and when the two are equal the apparatus is in the static operating condition. In the event the horsepower available exceeds the horsepower required, the air speed integrator of Fig. 1 is operated to increase assumed air speed and assumed vertical speed until the horsepower required again equals the horsepower available. In the event the horsepower required exceeds the horsepower available at any particular time, the air speed integrator of Fig. 1 is operated to decrease the assumed air speed and assumed vertical speed until the horsepower required again equals the horsepower available. The apparatus may be set in operation in response to a change in the factors of assumed horsepower available or assumed pitching attitude of the trainer.

Actual placing of a graph such as is shown in Fig. 4 in the proper position on the top of the lower base plate 126 will greatly assist in checking the proper functioning of the computing apparatus of this invention.

It will be appreciated that many changes may be made in the disclosed embodiment of this invention without departing from the substance thereof, as covered by the following claims.

I claim:

1. A flight computer of the type described comprising a first fixed pivot, a first arm mounted upon said pivot for movement thereabout, means for moving said arm about said first pivot in response to changes in the factor of assumed pitching attitude, a first linkage having one end connected to the outer end of said first arm, a second fixed pivot, a second arm mounted upon said second fixed pivot for movement thereabout, means for moving said second arm about said second fixed pivot in response to changes in the factor of assumed air speed, a second linkage having one end connected to the outer end of said second arm, and a master pivot connecting the second end of each of two linkages, a third fixed pivot, a third arm mounted upon said third fixed pivot for movement thereabout, and a third linkage interconnecting the outer end of said third arm and said master pivot, said third linkage comprising an ellipsographic mechanism, whereby said third arm is positioned about said third fixed pivot in response to changes in the factors of assumed air speed and assumed pitching attitude in accordance with the factor of assumed vertical speed.

2. A flight computer of the type described comprising a first fixed pivot, a first arm mounted upon said pivot for movement thereabout, means for moving said arm about said first pivot in response to changes in the factor of assumed pitching attitude, a first linkage having one end connected to the outer end of said first arm, a second fixed pivot, a second arm mounted upon said second fixed pivot for movement thereabout, means for moving said second arm about said second fixed pivot in response to changes in the factor of assumed air speed, a second linkage having one end connected to the outer end of said second arm and a master pivot connecting the second end of each of said two linkages, a third fixed pivot, a third arm mounted upon said third fixed pivot for movement thereabout, and a third linkage interconnecting the outer end of said third arm and said master pivot, said third linkage comprising an ellipsographic mechanism for imparting motion to said third arm only when said master pivot is moved in a path other than an elliptical path of predetermined orientation, whereby said third arm is positioned about said third fixed pivot in response to changes in the factors of assumed air speed and assumed pitching attitude in accordance with the factor of assumed vertical speed.

3. A flight computer of the type described comprising a first fixed pivot, a first arm mounted upon said pivot for movement thereabout, means for moving said arm about said first pivot in response to changes in the factor of assumed pitching attitude, a first linkage having one end connected to the outer end of said first arm, a second fixed pivot, a second arm mounted upon said second fixed pivot for movement thereabout, means for moving said second arm about said second fixed pivot in response to changes in the factor of assumed air speed, a second linkage having one end connected to the outer end of said second arm and a master pivot connecting the second end of each of said two likages, a third fixed pivot, a third arm mounted upon said third fixed pivot for movement thereabout, and a third linkage interconnecting the outer end of said third arm and said master pivot, said third linkage comprising an ellipsographic mechanism including a pair of pivoted links and a gear train carried thereby, whereby said third arm is positioned about said third fixed pivot in response to changes in the factors of assumed air speed and assumed pitching attitude in accordance with the factor of assumed vertical speed.

CHARLES J. KIDDER.

REFERENCES CITED

The following references are of record in the file of this patent:

UNITED STATES PATENTS

| Number | Name | Date |
|---|---|---|
| 2,093,254 | Spitzglass et al. | Sept. 14, 1937 |
| 2,096,032 | Engel | Oct. 19, 1937 |
| 2,328,306 | Svoboda | Aug. 31, 1943 |
| 2,340,350 | Svoboda | Feb. 1, 1944 |
| 2,394,180 | Imm | Feb. 5, 1946 |
| 2,459,726 | Svoboda | Jan. 18, 1949 |

FOREIGN PATENTS

| Number | Country | Date |
|---|---|---|
| 113,136 | Great Britain | Feb. 7, 1918 |
| 144,893 | Switzerland | May 16, 1931 |
| 548,093 | Great Britain | Sept. 24, 1942 |